United States Patent [19]

Hugl et al.

[11] 4,248,774

[45] Feb. 3, 1981

[54] P-SULPHOPHENOXY-PHENYLAZO INDOLES

[75] Inventors: Herbert Hugl; Gerhard Wolfrum, both of Leverkusen, Fed. Rep. of Germany

[73] Assignee: Bayer Aktiengesellschaft, Leverkusen, Fed. Rep. of Germany

[21] Appl. No.: 892,912

[22] Filed: Apr. 3, 1978

[30] Foreign Application Priority Data

Apr. 15, 1977 [DE] Fed. Rep. of Germany ....... 2715135

[51] Int. Cl.² .................. C09B 29/36; D06P 1/18; D06P 3/26; D06P 3/54
[52] U.S. Cl. .................. 260/165; 260/319.1; 260/326.13 R; 260/326.13 B; 260/456 A; 260/326.16
[58] Field of Search .................. 260/165

[56] References Cited

U.S. PATENT DOCUMENTS

| | | | |
|---|---|---|---|
| 3,557,080 | 1/1971 | Dehnert et al. | 260/165 |
| 3,891,619 | 6/1975 | Sommer et al. | 260/165 |
| 4,000,123 | 12/1976 | Sommer et al. | 260/165 |

Primary Examiner—Floyd D. Higel
Attorney, Agent, or Firm—Sprung, Felfe, Horn, Lynch & Kramer

[57] ABSTRACT

Synthetic fibre materials, especially polyester fibres, are dyed in yellowish to orange-red shades with good fastness to light and washing if dyestuffs of the formula

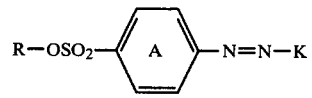

wherein
K denotes the radical of a coupling component of the indole series,
R denotes alkyl, cycloalkyl, aralkyl or aryl and the ring A can contain further non-ionic substituents which are customary in dyestuff chemistry, are used for dyeing.

3 Claims, No Drawings

P-SULPHOPHENOXY-PHENYLAZO INDOLES

The invention relates to disperse dyestuffs of the formula

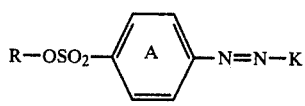

(I)

wherein
K denotes the radical of a coupling component of the indole series,
R denotes an optionally substituted alkyl, cycloalkyl, aralkyl or aryl radical and the ring A can contain further non-ionic substituents which are customary in dyestuff chemistry. Preferred dyestuffs correspond to the formula

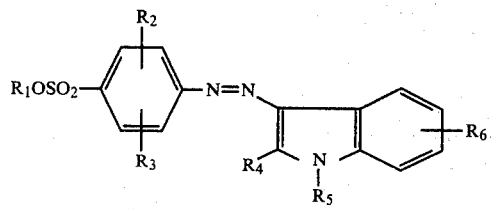

wherein
$R_1$ represents alkyl or aryl,
$R_2$ represents hydrogen, halogen, CN, $CF_3$, $NO_2$, $Q_1$, $-OQ_1$, $-COOQ_1$, $-CONQ_1Q_2$ or $NHCOQ_1$,
$R_3$ represents hydrogen, halogen, $CF_3$, $Q_1$ or $OQ_1$,
$R_4$ represents halogen or $Q_1$,
$R_5$ represents $Q_2$ and
$R_6$ represents hydrogen, halogen, $Q_1$, $OQ_1$ or $COOQ_1$,
wherein
$Q_1$ denotes alkyl or aryl and
$Q_2$ denotes hydrogen, alkyl or aralkyl.

The abovementioned alkyl, aralkyl, cycloalkyl and aryl radicals can contain further non-ionic substituents.

Suitable alkyl within the scope of this invention is, in particular, alkyl with 1 to 4 C atoms, which can be optionally further monosubstituted by cyano, halogen, such as chlorine, bromine or fluorine, hydroxyl or $C_1$-$C_4$-alkoxy, for example methyl, ethyl, n-propyl, iso-propyl, n-butyl, tert.-butyl, cyanoethyl or 2-chloroethyl.

Suitable aryl is, in particular, phenyl which is optionally monosubstituted to trisubstituted by halogen, $C_1$-$C_4$-alkyl, $C_1$-$C_4$-alkoxy, nitro, cyclohexyl or phenyl.

"Bulky" radicals are in those positions where they cause no steric hindrance, for example tert.-butyl in the m-position or p-position of a phenyl radical.

Suitable halogen is chlorine, bromine or fluorine, but preferably chlorine.

Suitable aralkyl is, for example, benzyl or phenethyl.

Suitable cycloalkyl is, for example, cyclopentyl, cyclohexyl and cycloheptyl.

Particularly preferred dyestuffs are those of the formula

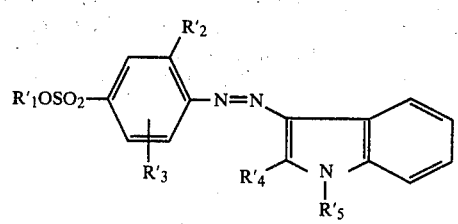

wherein
$R_1'$ represents phenyl which is optionally monosubstituted to trisubstituted by $C_1$-$C_4$-alkyl, chlorine, nitro, cyclohexyl or phenyl,
$R_2'$ stands halogen, cyano, trifluoromethyl, nitro, $C_1$-$C_4$-alkyl or $C_1$-$C_4$-alkoxy,
$R_3'$ stands H, halogen, trifluoromethyl, $C_1$-$C_4$-alkyl or $C_1$-$C_4$-alkoxy,
$R_4'$ stands $C_1$-$C_4$-alkyl or phenyl and
$R_5'$ stands $C_1$-$C_4$-alkyl, benzyl or phenethyl.

Very particularly preferred dyestuffs are those of the formula

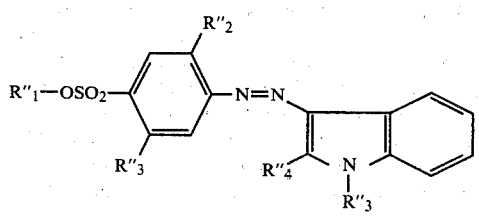

wherein
$R_1''$ represents phenyl, tolyl or chlorophenyl,
$R_2''$ and $R_3''$ represent chlorine,
$R_4''$ represents methyl or phenyl and
$R_5''$ represents $C_1$-$C_4$-alkyl.

The new dyestuffs are prepared in a manner which is in itself known, by customary diazotisation and coupling reactions.

The dyestuffs according to the invention are of very high tinctorial strength and are suitable for dyeing synthetic fibre materials, in particular those consisting of polyamides, such as, for example, polycaprolactam, polyhexamethylenediamine adipate or polyaminoundecanoic acid, but very particularly those consisting of polyester, such as polyethylene terephthalate and poly-1,4-cyclohexanedimethylene terephthalate, from aqueous liquors or organic solvents. The types of fibres mentioned are dyed in yellow to orange-red shades of good colour yield and with good fastness properties in use, such as, for example, fastness to light and wet processing.

EXAMPLE 1

31.8 g of 4-amino-2,5-dichloro-benzenesulphonic acid phenyl ester are suspended in 400 ml of water and 30 ml of concentrated hydrochloric acid. 73 ml of a 10% strength sodium nitrite solution are added dropwise at 0°–5° C. in the course of 15 minutes. After stirring for one hour at the temperature indicated, the excess nitrite is destroyed with amidosulphonic acid. This diazonium salt suspension is then added dropwise to a slurry of 22 g of 1-methyl-2-phenyl-indole in 100 ml of concentrated hydrochloric acid at 0°–5° C. in the course of 30 minutes. After stirring for 3 hours, the pH value is adjusted to 3.5 by slowly adding 10% strength sodium hydroxide solution. A further 3 hours thereafter, the precipitate is filtered off, washed with water and dried at 60° C. in a vacuum drying cabinet. This gives 45 g of a dyestuff of the formula

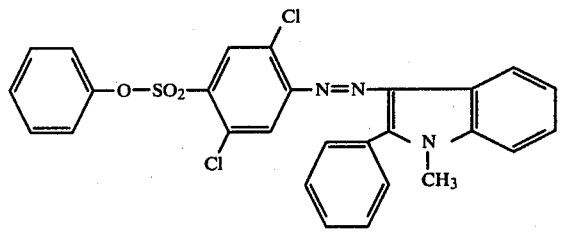

Dyeing Examples (1) 1 part of the dyestuff obtained according to Example 1 and finely dispersed by customary processes is stirred into 2,000 parts of water. The mixture is adjusted to a pH value of 5 to 6 with acetic acid, and 4 parts of ammonium sulphate and 2 parts of a commercially available dispersing agent based on a naphthalenesulphonic acid/formaldehyde condensation product are added. 100 parts of a polyester fabric based on polyethylene glycol terephthalate are introduced into the dye liquor thus obtained and dyeing is carried out at 120°–130° C. for 1½ hours. After subsequent rinsing, after-treatment by reduction with a 0.2% strength alkaline sodium dithionite solution for 15 minutes at 60° C., rinsing and drying, a reddish-tinged yellow dyeing with good fastness properties, in particular good fastness to light and sublimation, is obtained.

(2) 100 parts of a fabric consisting of polyethylene terephthalate fibres are introduced, at room temperature, into a dyebath which is prepared from 1 part of the monoazo dyestuff of Example 1 and 1,000 parts of tetrachloroethylene. The bath is heated to 110° C. in the course of 20 minutes, whilst vigorously circulating the liquor, and is kept at this temperature for 45 minutes. The liquor is then removed and the fabric is rinsed with fresh tetrachloroethylene at 40° C. After removing the rinsing liquor, the dyed material is freed from adhering solvent by spinning and drying in a stream of air. A strong reddish-tinged yellow dyeing of good general fastness properties is obtained.

(3) 0.1 g of the highly dispersed dyestuff according to Example 1 is introduced, at 40° C., into 1 l of water, which also contains 0.2 g of sodium dinaphthylmethanesulphonate and 0.3 g of cresotic acid methyl ester. 10 g of a fabric consisting of polyethylene terephthalate are introduced into this bath, the temperature of the dyebath is increased to 100° C. in the course of about 20 minutes and dyeing is carried out at this temperature for 60–90 minutes. A strong reddish-tinged yellow dyeing with good fastness to sublimation and light is obtained.

Similar dyestuffs which have similar properties to that obtained according to Example 1 result when the following diazo components containing sulphonic acid ester groups are diazotised and coupled with the following indole coupling components. The dyestuffs dye synthetic fibre materials, such as polyesters and polyamides, in the given colour shades with good fastness properties, for example good fastness to light, wet processing and sublimation.

| Example | Diazo component | Coupling component | Colour Shade |
|---|---|---|---|
| 2 | 4-amino-2,5-dichloro-benzenesulphonic acid 3-methyl-phenyl ester | 1-ethyl-2-phenyl-indole | golden yellow |
| 3 | 4-amino-2,5-dichloro-benzenesulphonic acid 4-methyl-phenyl ester | 1-propyl-2-methyl-indole | yellow |
| 4 | 4-amino-2,5-dichloro-benzenesulphonic acid 2-chloro-phenyl ester | 1-butyl-2-phenyl-indole | golden yellow |
| 5 | 4-amino-2,5-dichloro-benzenesulphonic acid 4-chloro-phenyl ester | 1,2-dimethyl-indole | yellow |
| 6 | 4-amino-2,5-dichloro-benzenesulphonic acid 2,4-dichloro-phenyl ester | 1-methyl-2-butyl-indole | yellow |
| 7 | 4-amino-2,5-dichloro-benzenesulphonic acid 2-ethyl-phenyl ester | 1-ethyl-2-phenyl-indole | golden yellow |
| 8 | 4-amino-2,5-dichloro-benzenesulphonic acid 3,5-dimethyl-phenyl ester | 1-benzyl-2-phenyl-indole | golden yellow |
| 9 | 4-amino-2,5-dichloro-benzenesulphonic acid 4-nitro-phenyl ester | 1-methyl-2-methyl-indole | yellow |
| 10 | 4-amino-3-chloro-benzenesulphonic acid 2,4,5-trichloro-phenyl ester | 1-ethyl-2-chloro-indole | yellow |
| 11 | 4-amino-3-nitro-benzenesulphonic acid 4-chloro-2-methyl-phenyl ester | 1-methyl-2-phenyl-indole | golden yellow |
| 12 | 4-amino-2-chloro-5-cyano-benzenesulphonic acid 2-ethyl-phenyl ester | 2-phenyl-indole | orange |
| 13 | 4-amino-2,5-dimethyl-benzenesulphonic acid 2,3-dimethyl-phenyl ester | 1-octyl-2-phenyl-indole | golden yellow |
| 14 | 4-amino-3-chloro-6-methoxy-benzenesulphonic acid 2,4-dimethyl-phenyl ester | 1-phenethyl-2-methyl-indole | yellow |
| 15 | 4-amino-2-methoxy-5-nitro-benzenesulphonic acid 4-chloro-2,5-dimethyl-phenyl ester | 1-methyl-2-phenyl-indole | orange |
| 16 | 4-amino-3-ethoxy-benzenesulphonic acid 2,5-dimethyl-phenyl ester | 1-propyl-2-methyl-indole | yellow |
| 17 | 4-amino-2,5-di-trifluoromethyl-benzenesulphonic acid 2-isopropyl-phenyl ester | 1-methyl-2-phenyl-5-methody-indole | golden yellow |
| 18 | 4-amino-3-trifluoromethyl-benzenesulphonic acid 4-tert.-butyl-phenyl ester | 2-phenyl-7-ethyl-indole | orange |
| 19 | 4-amino-2,5-dichloro-benzenesulphonic acid 2-isopropyl-5-methyl-phenyl ester | 2-phenyl-5-carboxyethyl-indole | orange |
| 20 | 4-amino-3-methyl-benzenesulphonic acid x-nonyl-phenyl ester | 1-methyl-2-phenyl-indole | golden |

| Example | Diazo component | Coupling component | Colour Shade |
|---|---|---|---|
| 21 | 4-amino-3-trifluoromethyl-benzenesulphonic acid 4-cyclohexyl-phenyl ester | 1-ethyl-2-phenyl-indole | yellow yellow |
| 22 | 4-amino-3-chloro-5-methyl-benzenesulphonic acid 4-phenyl-phenyl ester | 1-methyl-2-phenyl-indole | golden yellow |
| 23 | 4-amino-3-carboxymethyl-benzenesulphonic acid phenyl ester | 1-propyl-2-methyl-indole | yellow |
| 24 | 4-amino-3-acetylamino-benzenesulphonic acid 3-methyl-phenyl ester | 1-methyl-2-phenyl-indole | golden yellow |
| 25 | 4-amino-2,5-dichloro-benzenesulphonic acid butyl ester | 1-ethyl-2-phenyl-indole | golden yellow |
| 26 | 4-amino-3-trifluoromethyl-benzenesulphonic acid cyclohexyl ester | 1-methyl-2-methyl-indole | yellow |
| 27 | 4-amino-3-chloro-benzenesulphonic acid octyl ester | 1-methyl-2-phenyl-indole | golden yellow |
| 28 | 4-amino-benzenesulphonic acid 3-methyl-cyclohexyl ester | 1-methyl-2-phenyl-indole | yellow |
| 29 | 4-amino-2,5-dichloro-benzenesulphonic acid ethyl ester | 1-ethyl-2-phenyl-indole | golden yellow |
| 30 | 4-amino-2,5-dichloro-benzenesulphonic acid phenyl ester | 1-methyl-2-phenyl-5-carboxyethyl-indole | scarlet |

We claim:
1. A disperse dyestuff of the formula

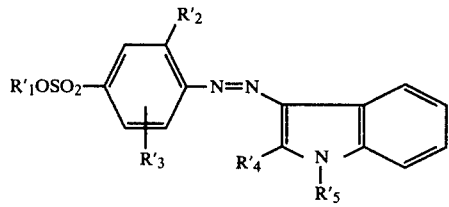

wherein
- $R_1'$ is phenyl or phenyl monosubstituted to trisubstituted by $C_1$–$C_4$-alkyl, chlorine, nitro, cyclohexyl or phenyl,
- $R_2'$ is halogen, cyano, trifluoromethyl, nitro, $C_1$–$C_4$-alkyl or $C_1$–$C_4$-alkoxy,
- $R_3'$ is H, halogen, trifluoromethyl, $C_1$–$C_4$-alkyl or $C_1$–$C_4$-alkoxy,
- $R_4'$ is $C_1$–$C_4$-alkyl or phenyl, and
- $R_5'$ is $C_1$–$C_4$-alkyl, benzyl or phenethyl.

2. A disperse dyestuff according to claim 1, of the formula

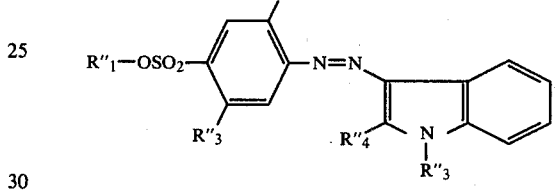

wherein
- $R_1''$ represents phenyl, tolyl or chlorophenyl,
- $R_2''$ and $R_3''$ represent chlorine,
- $R_4''$ represents methyl or phenyl and
- $R_5''$ represents $C_1$–$C_4$-alkyl.

3. A disperse dyestuff according to claim 1, of the formula

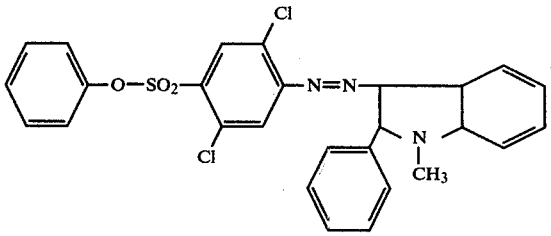

* * * * *